United States Patent [19]
Allen et al.

[11] 3,953,580
[45] Apr. 27, 1976

[54] BORIC ACID PROCESS

[75] Inventors: Richard Paul Allen, Kingston-upon-Thames; Cyril Alfred Morgan, East Molesey, both of England

[73] Assignee: United States Borax & Chemical Corporation, Los Angeles, Calif.

[22] Filed: Nov. 21, 1974

[21] Appl. No.: 525,836

[30] Foreign Application Priority Data
Nov. 22, 1973 United Kingdom............... 54144/73

[52] U.S. Cl................................ 423/283; 210/23 H
[51] Int. Cl.²........................................ C01B 35/10
[58] Field of Search............. 423/283; 210/22, 23 R, 210/23 U, 23 H

[56] References Cited
UNITED STATES PATENTS

| | | | |
|---|---|---|---|
| 1,888,391 | 11/1932 | Newman............................ | 423/283 |
| 2,276,210 | 3/1942 | Lane et al............................. | 210/22 |
| 3,132,095 | 5/1964 | Wolf et al.......................... | 210/23 U |
| 3,676,335 | 7/1972 | Lacey et al. ...................... | 210/23 H |
| 3,743,597 | 7/1973 | Credali et al. .................... | 210/23 H |

OTHER PUBLICATIONS

Graber et al., "Desalination," Vol. 7, Feb. 1970, pp. 249–258.

*Primary Examiner*—G. O. Peters
*Attorney, Agent, or Firm*—James R. Thornton

[57] ABSTRACT

Boric acid is recovered from impure mother liquors from boric acid processes by use of porous membranes, such as cellulose acetate, by a reverse osmosis technique.

7 Claims, No Drawings

BORIC ACID PROCESS

This invention relates to improvements in the well known processes for the manufacture of boric acid from sodium borate or colemanite (a calcium borate ore).

According to one process, boric acid is manufactured by the reaction of sulfuric acid with borax (or a sodium biborate of lower hydration) dissolved in hot, recycled mother liquor. Sodium sulphate is formed as a co-product. By correctly arranging conditions of crystallization, it is possible to separate most of the boric acid and sodium sulphate as relatively pure crystals leaving a liquor suitable for recycling. To obtain boric acid of merchantable quality, the crystals may be washed free from adherent mother liquor with a solution containing only minor amounts of impurities. It may be purified by recrystallization by dissolving in a liquor containing minor amounts of impurities.

The manufacture of boric acid from colemanite ores is essentially similar, although the low solubility of calcium sulphate permits substantial removal by filtration. However, some grades of ore contain impurities which result in soluble sulphates, notably magnesium compounds, which can accumulate in the circulating liquors.

It is desirable, in both of the foregoing processes, to have the produced mother liquors recirculated and the addition of water strictly controlled. Heretofore, in order to preclude undesirable levels of impurities accumulating in the circulating liquors which become detrimental to the process by yielding impure products, it has been necessary to discard or purify liquors by relatively expensive means.

According to the present invention, improvements are made to the processes whereby the amounts of water and boric acid discarded are reduced with no detrimental effect on the processes themselves. In some cases the non-permeating liquor, with enhanced concentration of sulphates, can be recirculated within that part of the process used for producing sodium sulphate.

It is known that liquors can be purified by the technique of reverse osmosis. In the purification of liquors containing small amounts of boron, it is also known that when membranes of the permeability customarily used for desalination are used, that is, when the rejection of sodium chloride as the principal impurity is greater than 95 per cent, an appreciable proportion of boron is found in the permeate. The rejection of boron is known to increase with pH; hence boric acid rather than borate ion permeates.

It has now been found that by the selection of more porous membranes having lower boron rejection levels, substantial amounts of the boric acid present in the feed, even at concentrations approaching saturation, will permeate; whereas more than 80% of the major impurities (sodium and magnesium sulphates) are rejected. Membranes used for this application are preferably of cellulose acetate annealed at low temperatures. Others, such as of nylon may be used.

An object of the present invention, therefore, is to provide a process for manufacturing boric acid by either of the aforesaid processes which incorporate the technique of reverse osmosis to upgrade circulating mother liquors whereby the amount of effluent containing boric acid is decreased without affecting the purity of the products. Another object of the invention is to provide liquors containing only small amounts of impurities which can be used beneficially in other parts of the process.

In one embodiment of the invention, a chosen portion of circulating, impure mother liquor is passed through cellulose acetate membranes in a typical reverse osmosis module. There is some rejection of boric acid present in the feed liquor; but it has been found that recoveries of greater than 75 per cent boric acid in the feed can be obtained. The rejected impurities, notably sodium, magnesium and sulphate, are retained in the liquor which does not pass through the membrane. The untreated liquor may be either discarded, returned to an appropriate part of the process, or diluted for treatment through another module. The amount of effluent is usually controlled at a minimum to prevent excessive loss of boric acid and water while avoiding possible crystallization of boric acid and dissolved electrolytes in the system and excessive applied pressures.

In an example showing use of this technique, 90 per cent of the circulating mother liquor which is used for washing the impure boric acid crystals is passed through the selected membranes of a reverse osmosis module, while 10 per cent, containing the reject ions, is discarded.

An example of typical results obtained with the use of a porous cellulose acetate membrane is given below.

| Feed Composition | % Rejection of Boric Acid | % Rejection of Sodium Sulphate |
|---|---|---|
| 4 % boric acid<br>5 % sodium sulphate | 9 | 95 |

After passing through the reverse osmosis module, the liquor may be circulated to the reaction vessel for further treatment, or it may be used in another part of the system where relatively pure liquors are required, as for example, in the washing of the product.

Thus, according to this invention, when the membranes are used for treating feed solutions that contain more than about 2 per cent boric acid and 0.1 per cent sodium sulphate and when about 80 per cent of the water is taken off as permeate, the ratio of boric acid-water permeate to boric acid-water feed is preferably not less than 0.7. Concurrently, the ratio of sodium sulphate-water permeate to sodium-sulphate feed is not greater than 0.3.

Although sulphates have been referred to — being the principal contaminants — reverse osmosis removes, to a greater or lesser extent compared with sulphates, many other impurities which can be present in the liquors.

Various changes and modifications of the invention can be made, and, to the extent that such variations incorporate the spirit of this invention, they are intended to be included within the scope of the appended claims.

What is claimed is:

1. In the process for the continuous production of boric acid which comprises the reaction of borate-containing ore with sulfuric acid in aqueous medium, separation of the resultant boric acid from the mother liquor by crystallization and recycling of the mother liquor to the process as solvent for subsequent quantities of borate ore, the improvement which comprises passing said recycling mother liquor through a porous permselective cellulose acetate membrane which has been annealed at low temperatures and having a low boron rejection level thereby removing impurities from the liquor, and recycling the permeate to said process.

2. The process according to claim 1 in which said borate-containing ore is sodium borate.

3. The process according to claim 1 in which said borate-containing ore is colemanite.

4. The process according to claim 1 in which the recycling boric acid-containing mother liquor contains more than about 2 per cent boric acid and 0.1 per cent sodium sulfate.

5. The process according to claim 1 in which about 80% of said recycling mother liquor is passed through the membrane.

6. The process according to claim 1 in which the ratio of boric acid-water permeate to boric acid-water feed is not less than 0.7 and the ratio of sodium sulphate-water permeate to sodium sulphate-water feed is not greater than 0.3.

7. The process according to claim 1 in which the concentration of boric acid in said recycling mother liquor is near saturation.

* * * * *